US012152427B2

(12) United States Patent
Jeup et al.

(10) Patent No.: US 12,152,427 B2
(45) Date of Patent: Nov. 26, 2024

(54) HINGE AND CABINET INCORPORATING THE SAME

(71) Applicant: RH US, LLC, Corte Madera, CA (US)

(72) Inventors: Joseph John Jeup, Grandville, MI (US); Casey Lee Potter, Grand Rapids, MI (US)

(73) Assignee: RH US, LLC, Corte Madera, CA (US)

( * ) Notice: Subject to any disclaimer, the term of this patent is extended or adjusted under 35 U.S.C. 154(b) by 0 days.

(21) Appl. No.: 18/494,082

(22) Filed: Oct. 25, 2023

(65) Prior Publication Data

US 2024/0167307 A1 May 23, 2024

Related U.S. Application Data

(60) Provisional application No. 63/384,733, filed on Nov. 22, 2022.

(51) Int. Cl.
*E05D 7/04* (2006.01)

(52) U.S. Cl.
CPC .... *E05D 7/0415* (2013.01); *E05D 2007/0492* (2013.01); *E05Y 2900/20* (2013.01)

(58) Field of Classification Search
CPC ....... E05D 7/04; E05D 7/0415; E05D 7/0027; E05D 7/0045; E05D 7/0009; E05D 3/02; E05D 5/02; E05D 5/0207; E05D 5/0215; E05D 5/0223; E05D 5/023; E05D 5/043; E05D 11/0054; E05D 2007/0036;
(Continued)

(56) References Cited

U.S. PATENT DOCUMENTS 9,422,756 B2 * 8/2016 Bacchetti ............ E05D 11/0054
9,605,457 B2 3/2017 Humble
(Continued)

FOREIGN PATENT DOCUMENTS

CN 203584100 U * 5/2014
CN 213245317 U * 5/2021
(Continued)

OTHER PUBLICATIONS

International Search Report for Application No. PCT/US2023/077794, mailed Feb. 26, 2024, 10 pages.

*Primary Examiner* — Chuck Y Mah
(74) *Attorney, Agent, or Firm* — Lewis Roca Rothgerber Christie LLP

(57) ABSTRACT

A hinge includes a fore-aft adjustment bracket, a lateral adjustment bracket, and a vertical adjustment bracket including a fore-aft adjustment opening, a lateral adjustment opening, and a vertical adjustment opening, respectively. The hinge also includes an upper housing member coupled to the fore-aft adjustment bracket, and a lower housing member coupled to the lateral adjustment bracket and the vertical adjustment bracket. The hinge further includes a hinge pin accommodated in a hinge pin opening defined by the upper and lower housing members, a pair of guide pins accommodated in a pair of arcuate channels in the lower housing, and a fore-aft adjustment eccentric fastener, a lateral adjustment eccentric fastener, and a vertical adjustment eccentric fastener configured to extend into the fore-aft adjustment opening, the lateral adjustment opening, and the vertical adjustment opening, respectively.

14 Claims, 6 Drawing Sheets

(58) Field of Classification Search
CPC .... E05D 2007/0469; E05D 2007/0492; E05Y 2600/10; E05Y 2600/502; E05Y 2900/132; E05Y 2900/148; E05Y 2900/532; E05Y 2900/546; E05Y 2600/12; E05Y 2600/31; E05Y 2600/51; E05Y 2600/526; E05Y 2600/54; E05Y 2600/61; E05Y 2600/622; E06B 2009/007; B62D 65/06; B62D 16/235–238
See application file for complete search history.

(56) References Cited

U.S. PATENT DOCUMENTS

| | | | | |
|---|---|---|---|---|
| 10,422,171 | B2 * | 9/2019 | Lizotte | E05D 7/04 |
| 2001/0025396 | A1 * | 10/2001 | Sitter | E05D 11/0027 49/501 |
| 2002/0073509 | A1 * | 6/2002 | Dean | E05D 7/0415 16/387 |
| 2012/0102674 | A1 * | 5/2012 | King | E05D 7/0423 16/248 |
| 2017/0146282 | A1 * | 5/2017 | Dodge | E05D 3/02 |
| 2017/0362867 | A1 * | 12/2017 | Friz | E05D 5/023 |

FOREIGN PATENT DOCUMENTS

| | | | |
|---|---|---|---|
| DE | 197 32 702 | A1 | 2/1999 |
| JP | 3406274 | B2 * | 5/2003 |

* cited by examiner

HINGE AND CABINET INCORPORATING THE SAME

CROSS-REFERENCE TO RELATED APPLICATION(S)

The present application claims priority to and the benefit of U.S. Provisional Application No. 63/384,733, filed Nov. 22, 2022, the entire content of which is incorporated herein by reference.

BACKGROUND

1. Field

The present application relates to hinges and cabinets including a hinge.

2. Description of the Related Art

A variety of different types of hinges exist, including scissor hinges, butt hinges, ball-bearing hinges, barrel hinges, concealed hinges, knife hinges, piano hinges, pivot hinges, strap hinges, offset hinges, overlay hinges, and cylinder hinges. However, these conventional hinges do not include sufficient adjustability, soft-closing, and swing retention. Additionally, some of these conventional hinges are bulky and unsightly, particularly once they are installed to secure a door to a cabinet.

SUMMARY

The present disclosure relates to various embodiments of a hinge and a cabinet including a hinge. In one embodiment, the hinge includes a fore-aft adjustment bracket, a lateral adjustment bracket, and a vertical adjustment bracket including a fore-aft adjustment opening, a lateral adjustment opening, and a vertical adjustment opening, respectively. The hinge also includes an upper housing member coupled to the fore-aft adjustment bracket, and a lower housing member coupled to the lateral adjustment bracket and the vertical adjustment bracket. The hinge further includes a hinge pin accommodated in a hinge pin opening defined by the upper and lower housing members, a pair of guide pins accommodated in a pair of arcuate channels in the lower housing, and a fore-aft adjustment eccentric fastener, a lateral adjustment eccentric fastener, and a vertical adjustment eccentric fastener configured to extend into the fore-aft adjustment opening, the lateral adjustment opening, and the vertical adjustment opening, respectively.

The hinge may also include an upper cover plate configured to cover a portion of the upper housing connected to the fore-aft adjustment bracket.

The hinge may also include a rear cover plate.

The hinge may include a guide plate between the lateral adjustment bracket and the rear cover plate. The guide plate may include a backing plate including a pair of openings accommodating the lateral adjustment eccentric fastener and the vertical adjustment eccentric fastener, and a support rail on a front surface of the backing plate. The support rail supports the lateral adjustment bracket and the vertical adjustment bracket.

Each of the fore-aft adjustment eccentric fastener, the lateral adjustment eccentric fastener, and the vertical adjustment eccentric fastener may include a head, a stem coupled to the head, and a cam coupled to an end of the stem, wherein the stem is axially offset from a centerline of the head.

The upper housing may include a cylindrical portion, an extension portion extending rearward from the cylindrical portion, and a pair of fore-aft adjustment guide pins extending upward from the extension portion.

The fore-aft adjustment bracket may include a pair of fore-aft guide openings elongated in a fore-aft direction, and the pair of fore-aft adjustment guide pins may be slidable in the pair of fore-aft guide openings.

The lateral adjustment bracket may include a pair of vertical adjustment guide pins.

The vertical adjustment bracket may include a pair of vertical guide openings elongated in a vertical direction, and the pair of vertical adjustment guide pins may be slidable in the pair of vertical guide openings.

The guide bracket may include a pair of lateral adjustment guide pins.

The lateral adjustment bracket may include a pair of lateral guide openings elongated in a lateral direction, and the pair of lateral adjustment guide pins may be slidable in the pair of lateral guide openings.

The lateral adjustment bracket may include a pass-through opening, and the stem of the vertical adjustment eccentric fastener may extend through the pass-through opening.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable hinge and/or cabinet incorporating a hinge.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure relates to various embodiments of a hinge and a cabinet including a hinge. The hinge according to various embodiments of the present disclosure is adjustable in a fore-aft (i.e., a front and back) direction, a lateral (i.e., left to right) direction, and a vertical (i.e., up and down) direction. Additionally, the hinge according to various embodiments of the present disclosure includes a swing retention feature (i.e., the hinge causes the cabinet door to remain in place at one or more angles without inadvertently closing) and a soft-close feature (i.e., the hinge prevents or at least mitigates against the cabinet door slamming closed).

Figure 1B:
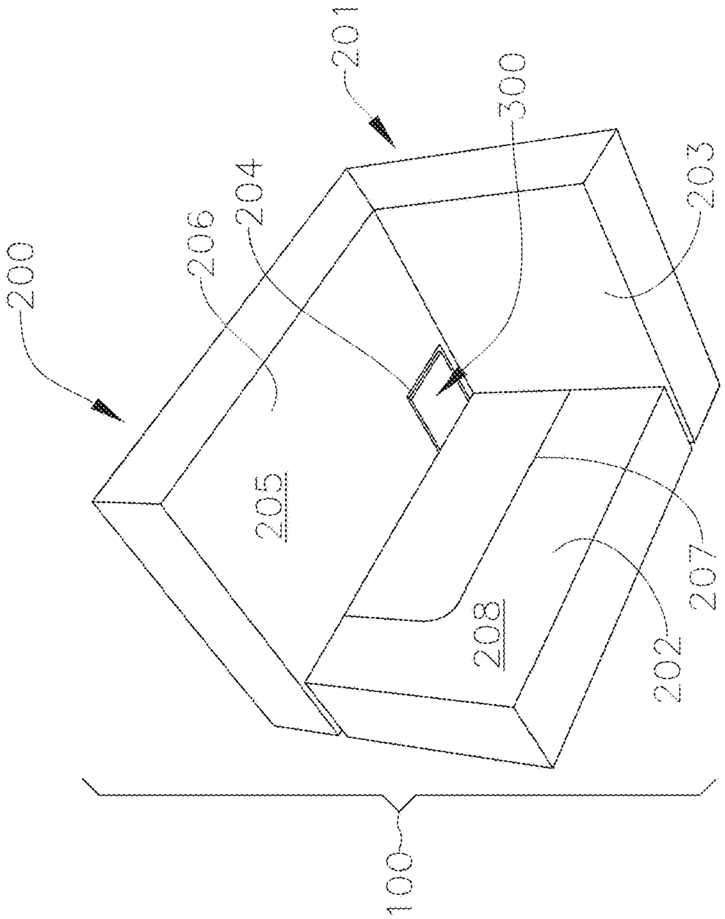
FIGS. 1A-1B are a front perspective view and a rear perspective view, respectively, of a cabinet including a hinge.
Figure 1A:
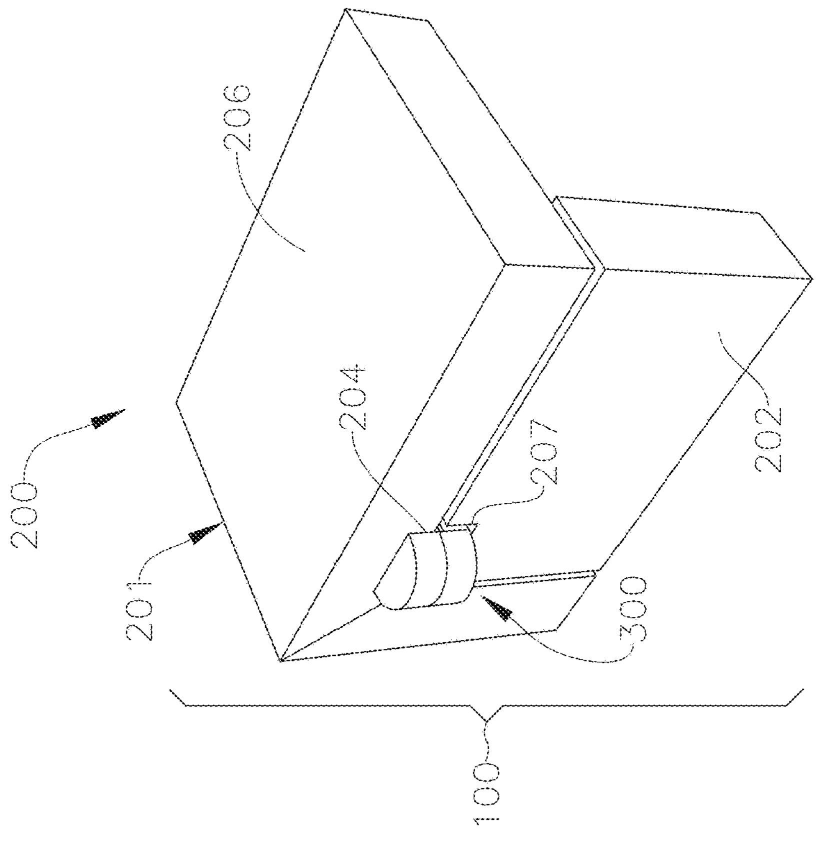
Figure 2:
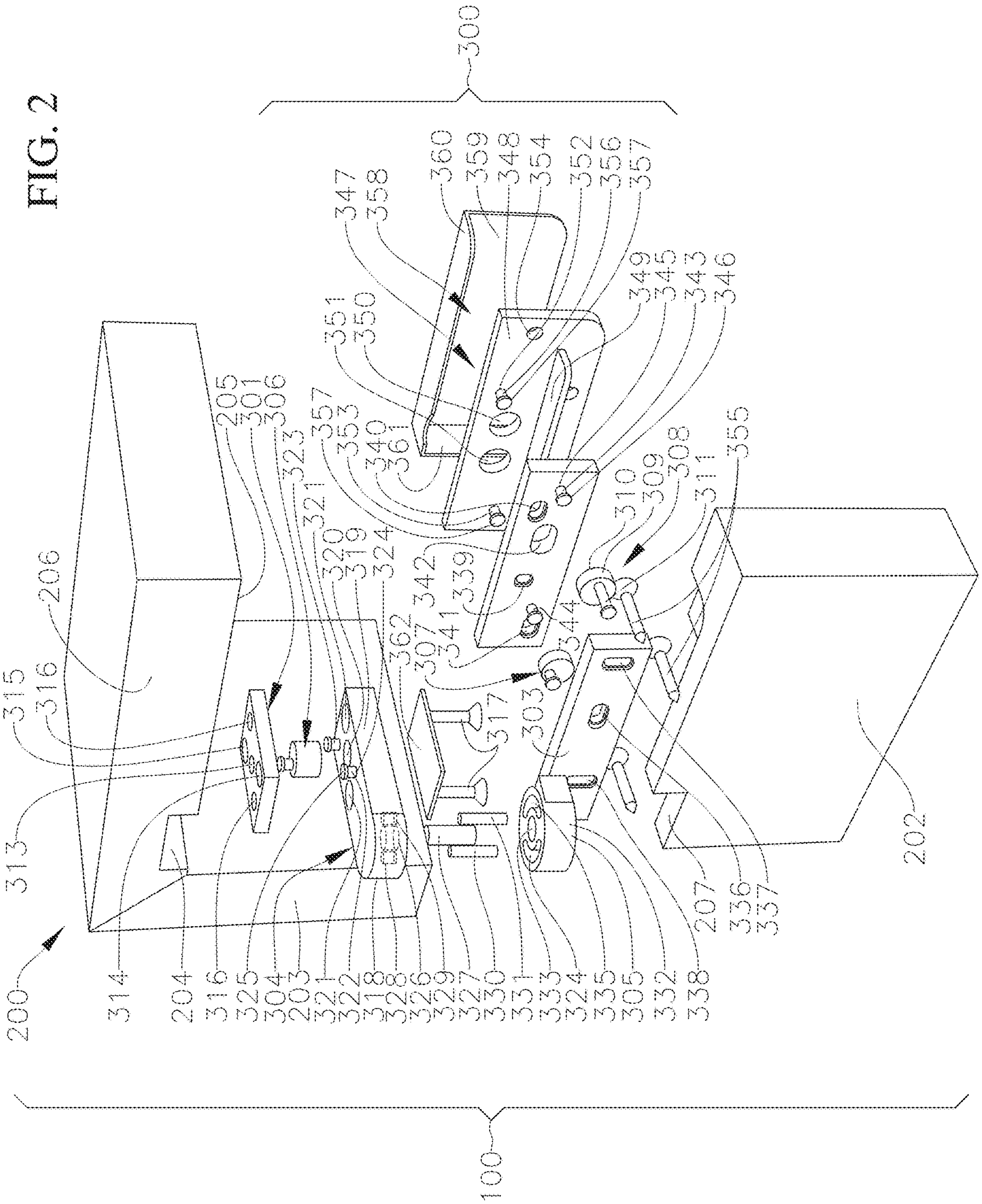
FIG. 2 is an exploded front perspective view of the embodiment of the hinge illustrated in FIGS. 1A-1B.
Figures 3A, 3B:
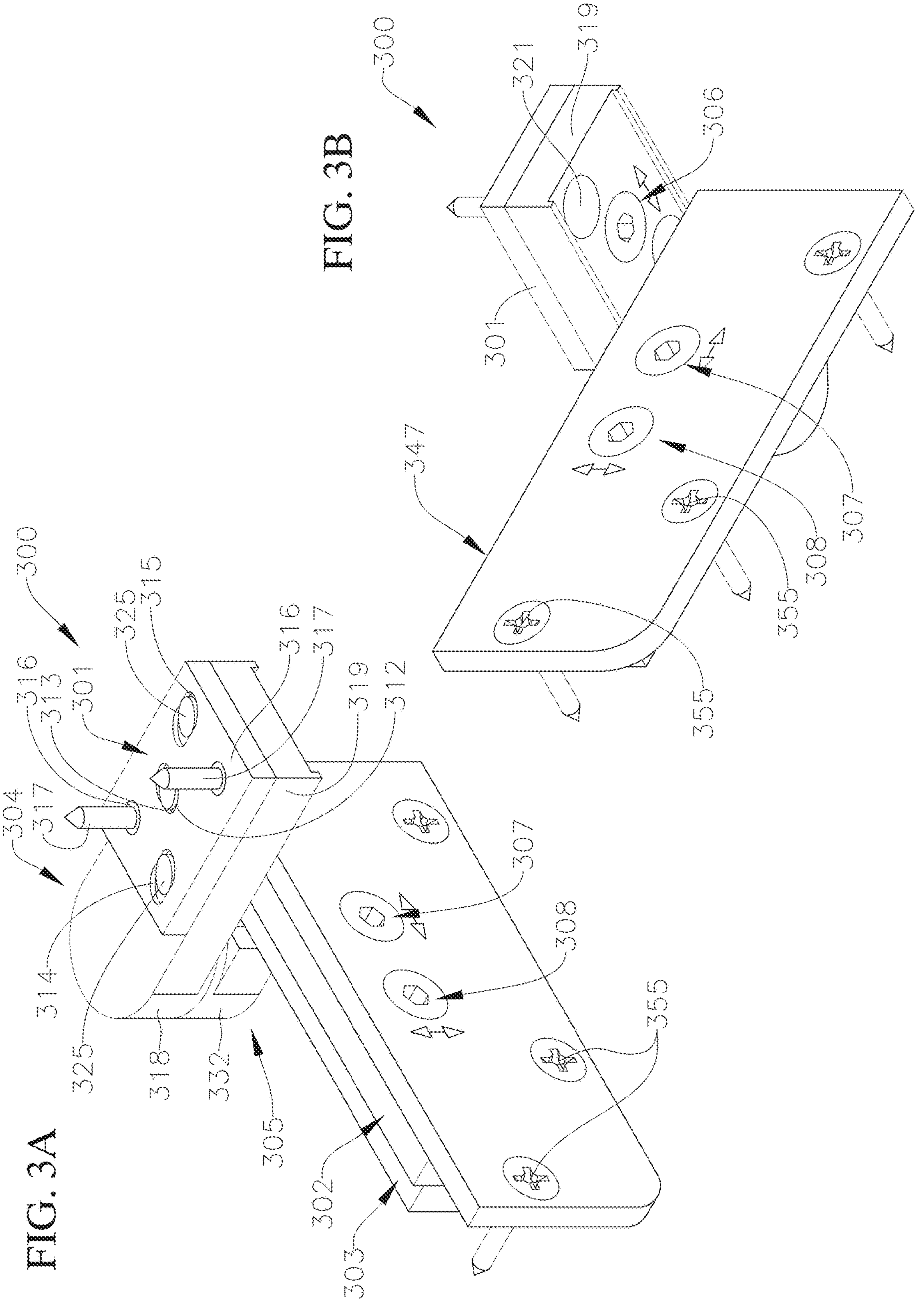
FIGS. 3A-3H depict front and rear perspective views of the embodiment of the hinge illustrated in FIGS. 1A-1B.
Figure 3D:
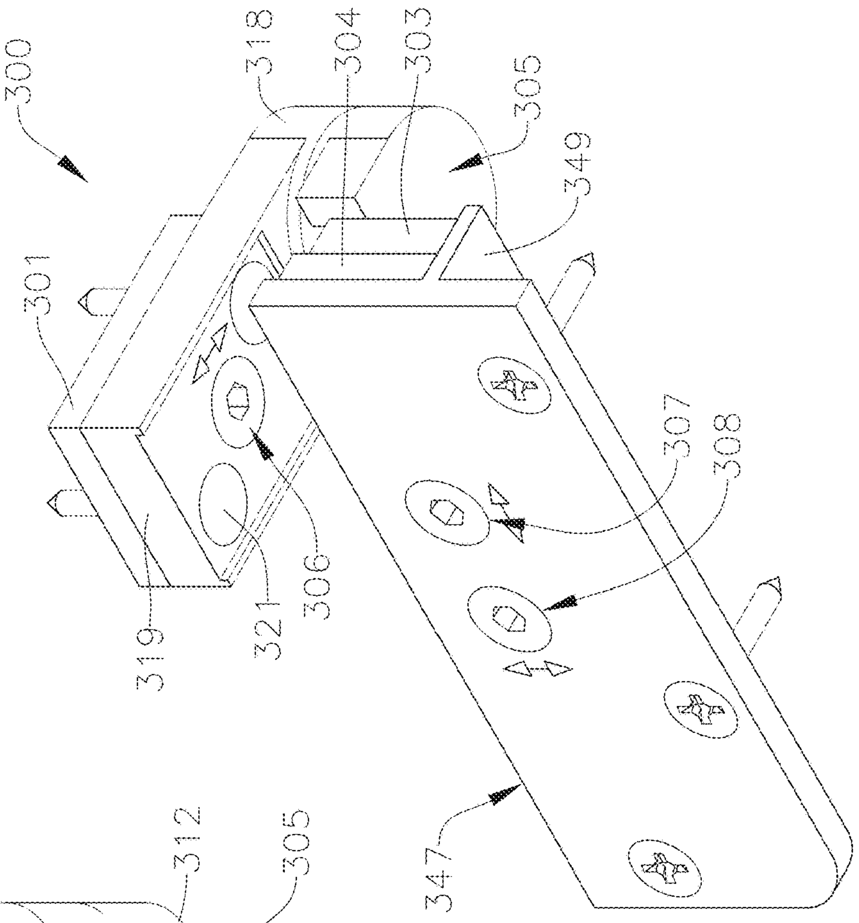
Figure 3C:
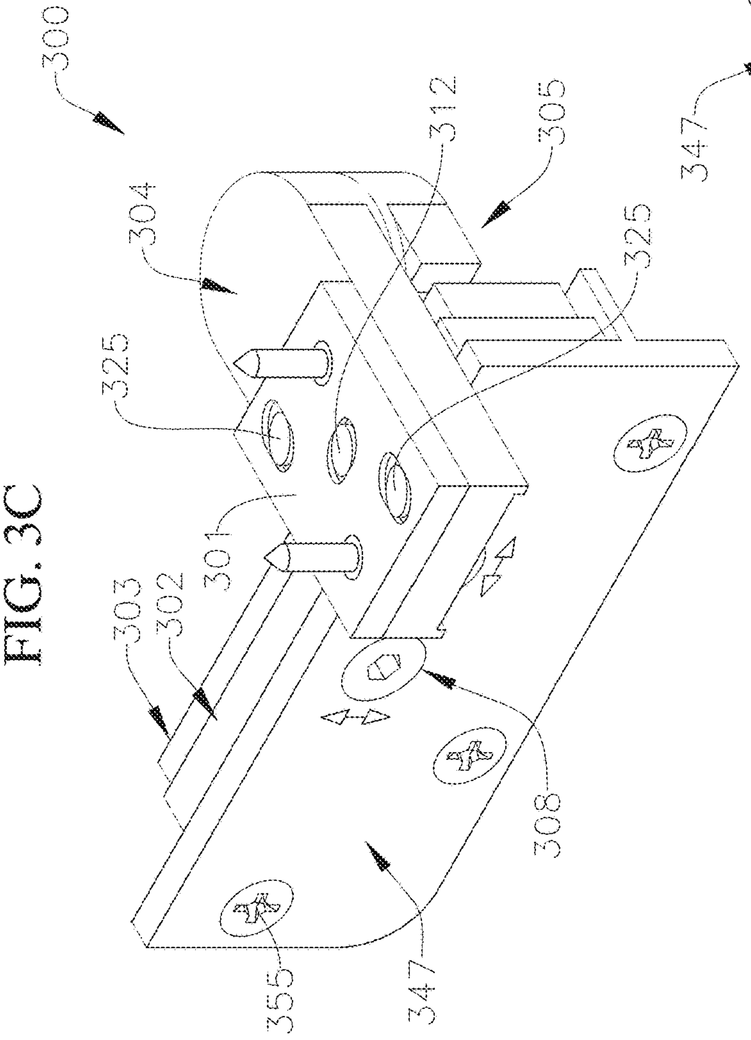
Figures 3E, 3F:
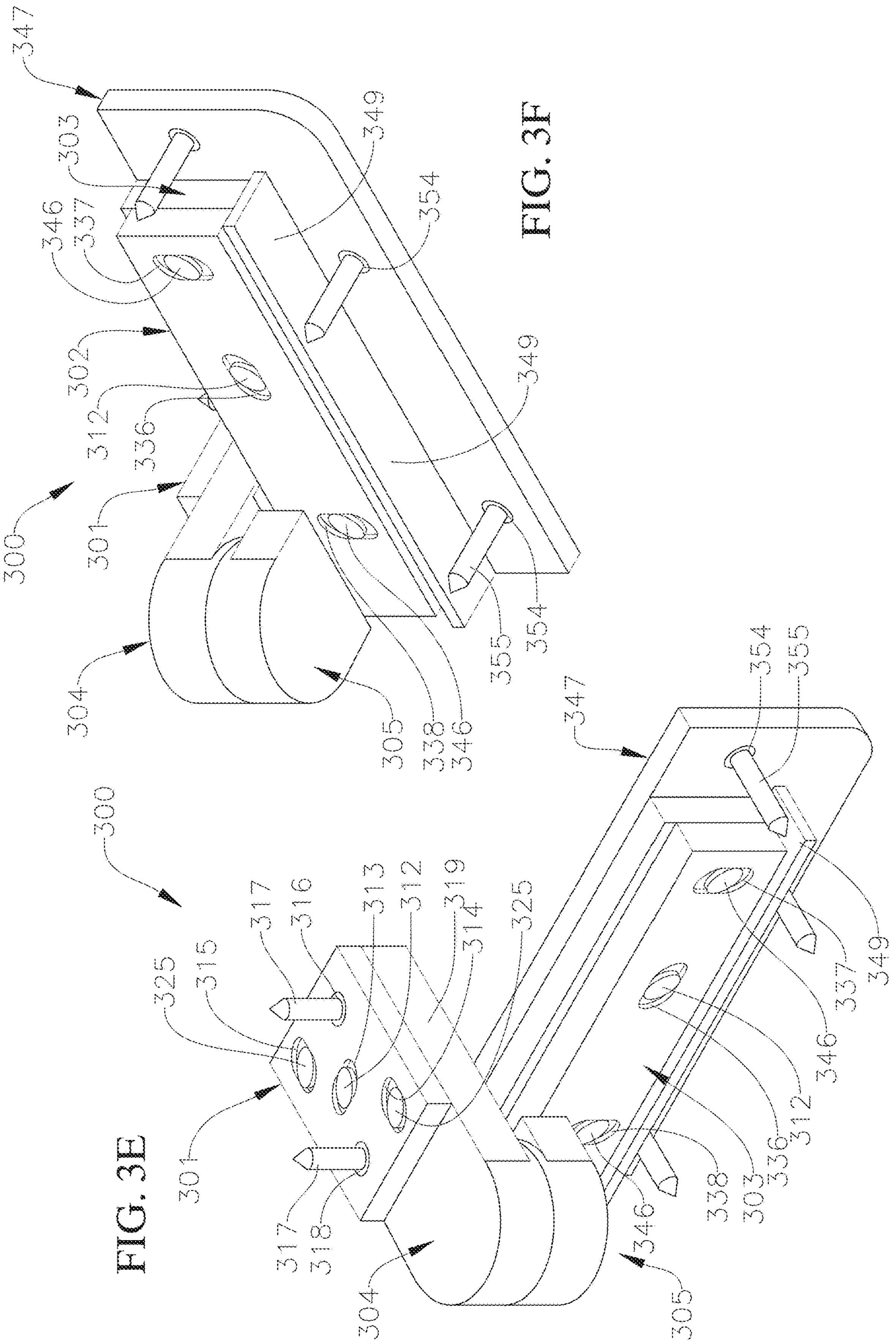
Figure 3H:
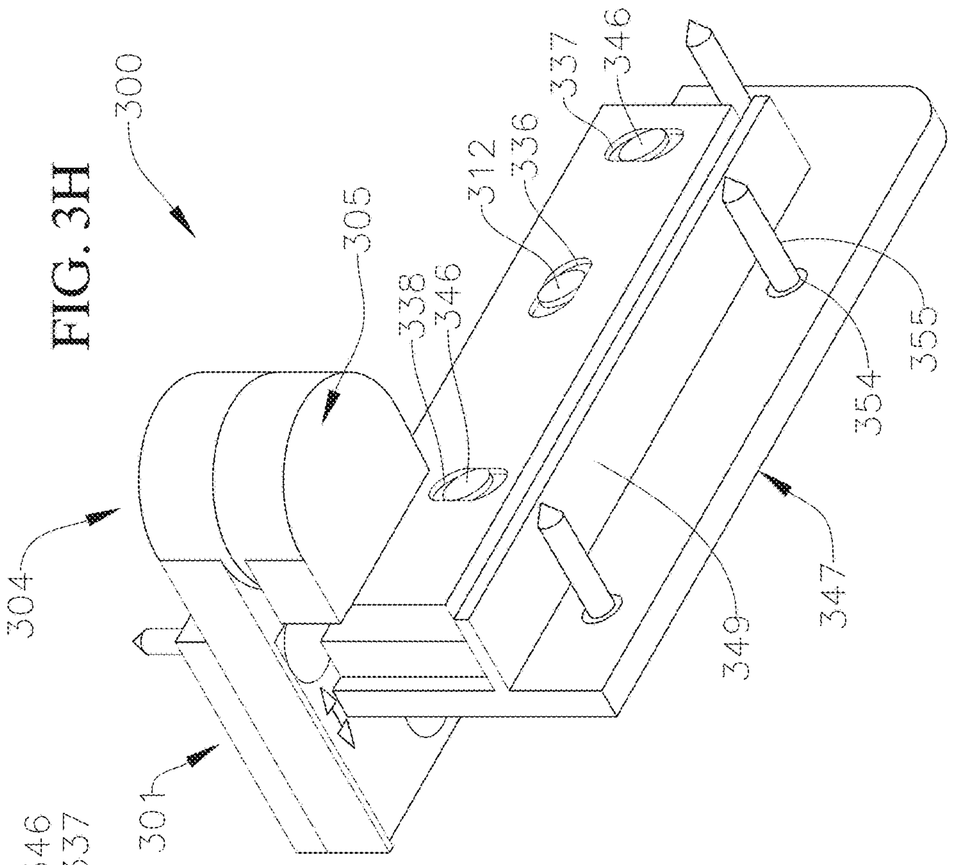
Figure 3G:
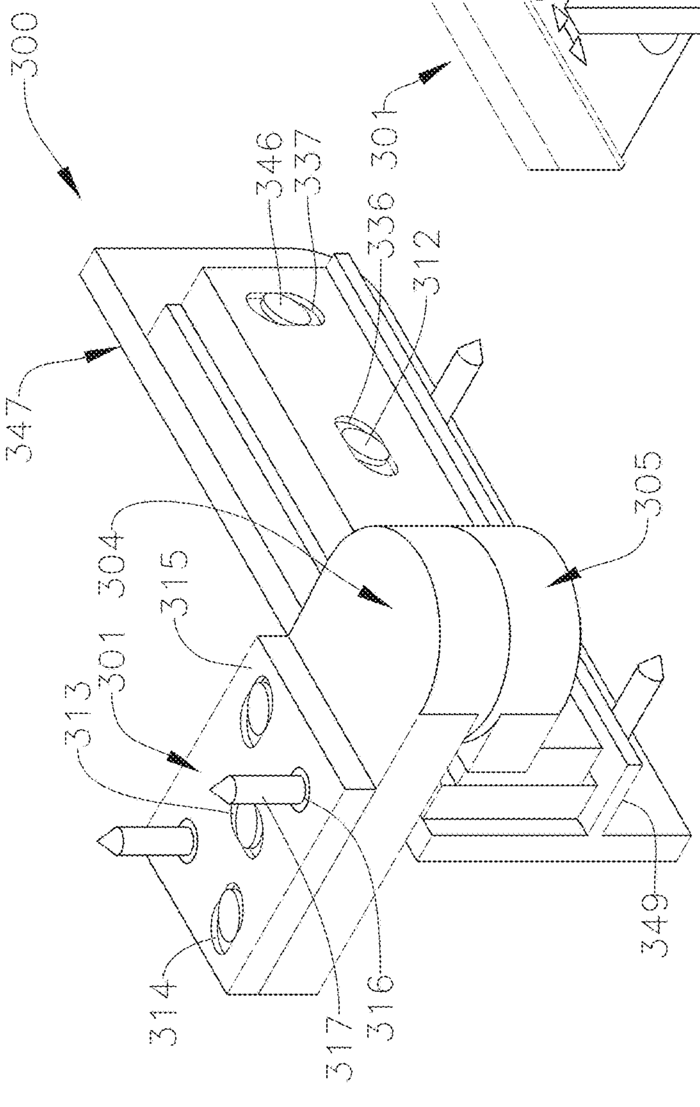

With reference now to FIGS. 1A-1B, a cabinet assembly 100 according to one embodiment of the present disclosure includes a cabinet 200 having a framework 201 and a cabinet door 202, and a hinge 300 hingedly connecting the cabinet door 202 to a sidewall 203 of the framework 201. Additionally, in the illustrated embodiment, the framework 201 of the cabinet 200 includes a notch or a recess 204 in an inner surface 205 of an upper wall 206 that is configured to accommodate a portion of the hinge 300, and a notch or recess 207 in a rear surface 208 of the cabinet door 202 to accommodate another portion of the hinge 300. The recess 204 in the inner surface 205 of the upper wall 206 extends rearward from a front surface 209 of the upper wall 206, and the recess 207 in the cabinet door 202 extends inward from an outer surface 210 of the cabinet door 202.

With reference now to embodiment illustrated in FIGS. 2 and 3A-3H, the hinge 300 includes a fore-aft adjustment bracket 301, a lateral adjustment bracket 302, a vertical adjustment bracket 303, an upper housing 304 coupled to the fore-aft adjustment bracket 301, and a lower housing member 305 coupled to the lateral adjustment bracket 302 and to the vertical adjustment bracket 303. In the illustrated embodiment, the hinge 300 also includes a fore-aft adjustment eccentric fastener 306 configured to adjust the fore-aft position of the hinge 300 on the cabinet 200 when the fore-aft adjustment eccentric fastener 306 is rotated, a lateral adjustment eccentric fastener 307 configured to adjust the lateral position of the hinge 300 on the cabinet 200 when the lateral adjustment eccentric fastener 307 is rotated, and a vertical adjustment eccentric fastener 308 configured to adjust the vertical position of the hinge 300 on the cabinet 200 when the vertical adjustment eccentric fastener 308 is rotated.

In the illustrated embodiment, each of the eccentric fasteners 306, 307, 308 includes a head 309 having a tool engagement portion 310 (e.g., a hex-head shaped recess), a stem 311 extending from the head 309, and a cam 312 on an end of the stem 311 opposite to the head 309. In the illustrated embodiment, a longitudinal centerline of the stem 311 is radially offset from the centerline of the head 309 (i.e., the stem 311 is not coaxial with the head 309). Although in the illustrated embodiment the cam 312 is a circular plate, in one or more embodiments the cam 312 may have any other suitable shape, such as oval.

In the illustrated embodiment, the fore-aft adjustment bracket 301 is a flat plate (e.g., a flat rectangular plate) having a fore-aft adjustment opening 313 (e.g., a hole) and a pair of fore-aft guide openings 314, 315 that are each elongated in a fore-aft direction (e.g., a pair of holes that are elongated in a front-back direction). The fore-aft adjustment bracket 301 also includes a plurality of openings 316 configured to receive fasteners 317 (e.g., screws) securing the fore-aft adjustment bracket 301 to the upper wall 206 of the cabinet 200.

In the illustrated embodiment, the upper housing 304 includes a cylindrical portion 318 and an extension portion 319 extending rearward from the cylindrical portion 318. Additionally, in the illustrated embodiment, the extension portion 319 of the upper housing 304 includes a plurality of openings 320, 321, and a pair of fore-aft guide pins 322, 323 extending upward from an upper surface of the extension portion 319. The fore-aft guide pins 322, 323 extend up into the fore-aft guide openings 314, 315 in the fore-aft adjustment bracket 301. In the illustrated embodiment, each of the fore-aft guide pins 322, 323 includes a stem 324 and an enlarged head 325 on an upper end of the stem 324, although in one or more embodiments the fore-aft guide pins 322, 323 may have any other suitable shape. One of the openings 320 in the extension portion 319 of the upper housing 304 is configured to accommodate a portion of the fore-aft adjustment eccentric fastener 306 (e.g., the head 309 of the fore-aft adjustment eccentric fastener 306) and the other openings 321 in the extension portion 319 are configured to provide access to the fasteners 317 securing the fore-aft adjustment bracket 301 to the upper wall 206 of the cabinet 200.

Additionally, in the illustrated embodiment, a lower surface of the cylindrical portion 318 of the upper housing 304 includes a central opening 326 configured to receive an upper portion of a hinge pin 327, and a pair of peripheral openings 328, 329 around the central opening 326 that are configured to receive upper portions of a pair of rotational guide pins 330, 331.

In the illustrated embodiment, the lower housing 305 includes a cylindrical portion 332 having a central opening 333 in an upper surface, and a pair of arcuate channels 334, 335 around the central opening 333. The central opening 333 of the lower housing 305 is configured to receive a lower portion of the hinge pin 327, and the arcuate channels 334, 335 are configured to receive lower portions of the pair of rotational guide pins 330, 331.

In the illustrated embodiment, the vertical adjustment bracket 303 is a flat plate (e.g., a flat rectangular plate oriented vertically) that includes a vertical adjustment opening 336 and a pair of vertical guide openings 337, 338 that are each elongated in a vertical direction (e.g., a pair of holes that are elongated in an up-down direction). In the illustrated embodiment, the vertical guide openings 337, 338 are on opposite sides of the vertical adjustment opening 336.

In the illustrated embodiment, the lateral adjustment bracket 302 is a flat plate (e.g., a flat rectangular plate oriented vertically) that includes a lateral adjustment opening 339 and a pair of lateral guide openings 340, 341 that are each elongated in a lateral direction (e.g., a pair of holes that are elongated in a left-right direction). The lateral adjustment bracket 302 also includes a pass-through opening 342, and a pair of vertical adjustment guide pins 343, 344 extending forward from a front surface of the lateral adjustment bracket 302. In the illustrated embodiment, each of the vertical adjustment guide pins 343, 344 includes a stem 345 and an enlarged head 346 on a forward end of the stem 345, although in one or more embodiments the vertical adjustment guide pins 343, 344 may have any other suitable shape.

In the illustrated embodiment, the hinge 300 also includes a guide bracket 347. In the illustrated embodiment, the guide bracket 347 includes a flat backing plate 348 (e.g., a flat rectangular plate oriented vertically) and a guide rail 349 extending forward from a front surface of the backing plate 348. In in the illustrated embodiment, the guide rail 349 is a flat flange or rib extending horizontally (or substantially horizontally) along at least a portion of the front surface of the backing plate 348. The guide rail 349 of the guide bracket 347 supports the lateral adjustment bracket 302 and the vertical adjustment bracket 303.

Accordingly, in one or more embodiments, the depth of the guide rail 349 may be equal to (or substantially equal to) or greater than a combined thickness of the lateral adjustment bracket 302 and the vertical adjustment bracket 303.

Additionally, in the illustrated embodiment, the guide bracket 347 includes a pair of openings 350, 351 (e.g., holes) configured to accommodate portions of the vertical adjustment eccentric fastener 308 and the lateral adjustment eccentric fastener 307, respectively, a pair of lateral guide pins 352, 353 extending forward from a front surface of the backing plate 348, and a plurality of openings 354 (e.g., holes) configured to receive fasteners 355 (e.g., screws) securing the guide bracket 347 to the cabinet door 202. In the illustrated embodiment, each of the lateral guide pins 352, 353 includes a stem 356 and an enlarged head 357 on a forward end of the stem 356, although in one or more embodiments the lateral guide pins 352, 353 may have any other suitable shape.

In the illustrated embodiment, the hinge 300 also includes a rear cover plate 358 configured to cover (i.e., conceal) the guide bracket 347, the lateral adjustment bracket 302, and the vertical adjustment bracket 303. In the illustrated embodiment, the rear cover plate 358 includes a back plate 359, an upper lip 360 extending forward from an upper edge of the back plate 359, and a side lip 361 extending forward from a side edge of the back plate 359. Additionally, in the illustrated embodiment, the hinge 300 includes an upper cover plate 362 configured to cover (i.e., conceal) the extension portion 319 of the upper housing 304.

When the hinge 300 is assembled, the upper portion of the hinge pin 327 extends into the central opening 326 of the upper housing 304, the lower portion of the hinge pin 327 extends into the central opening 333 of the lower housing 305, upper portions of the rotational guide pins 330, 331 extend into the peripheral openings 328, 329 in the upper housing 304, and the lower portions of the rotational guide pins 330, 331 extend into the arcuate channels 334, 335 in the lower housing 305.

When the hinge 300 is installed on the cabinet 200, the fore-aft adjustment bracket 301 and the extension portion 319 of the upper housing 304 are accommodated in (e.g., recessed in) the recess 204 in the inner surface 205 of the upper wall 206 of the cabinet 200, and the fasteners 317 extend through the openings 316 in the fore-aft adjustment bracket 301 and secure the fore-aft adjustment bracket 301 to the upper wall 206 of the cabinet 200. Additionally, when the hinge 300 is installed on the cabinet 200, the fore-aft guide pins 322, 323 of the upper housing 304 extend into the pair of fore-aft guide openings 314, 315 in the fore-aft adjustment bracket 301, the head 309 of the fore-aft adjustment eccentric fastener 306 is accommodated in one of the openings 320 in the upper housing 304, and the cam 312 of the fore-aft adjustment eccentric fastener 306 is in the fore-aft adjustment opening 313.

Additionally, when the hinge 300 is installed on the cabinet 200, the lateral adjustment bracket 302, the vertical adjustment bracket 303, and the guide bracket 347 are accommodated in (e.g., recessed in) the recess 207 in the rear surface 208 of the cabinet door 202, the fasteners 355 extend through the openings 354 in the guide bracket 347 and secure the guide bracket 347 to the cabinet door 202, and the lateral adjustment bracket 302 and the vertical adjustment bracket 303 are supported on the guide rail 349 of the guide bracket 347. Moreover, the lateral guide pins 352, 353 of the guide bracket 347 extend into the lateral guide openings 340, 341 of the lateral adjustment bracket 302, the head 309 of the lateral adjustment eccentric fastener 307 is accommodated in one of the openings in the guide bracket 347 and the cam 312 of the lateral adjustment eccentric fastener 307 is in the lateral adjustment opening 339 of the lateral adjustment bracket 302.

Furthermore, when the hinge 300 is installed on the cabinet 200, the vertical adjustment guide pins 343, 344 of the lateral adjustment bracket 302 extend into the vertical guide openings 337, 338 of the vertical adjustment bracket 303, the head 309 of the vertical adjustment eccentric fastener 308 is accommodated in the other opening in the guide bracket 347, the stem 311 of the vertical adjustment eccentric fastener 308 passes through the pass-through opening 342 of the lateral adjustment bracket 302, and the cam 312 of the vertical adjustment eccentric fastener 308 is in the vertical adjustment opening 336 in the vertical adjustment bracket 303.

To adjust the position of the hinge 300 on the cabinet, the lateral adjustment eccentric fastener 307, the vertical adjustment eccentric fastener 308, and/or the fore-aft adjustment eccentric fastener 306 may be rotated. For instance, the fore-aft adjustment eccentric fastener 306 may be rotated to adjust the fore-aft (i.e., front-back) position of the hinge 300 on the cabinet. As the fore-aft adjustment eccentric fastener 306 is rotated, the engagement between the cam 312 of the fore-aft adjustment eccentric fastener 306 and the fore-aft adjustment opening 313 in the fore-aft adjustment bracket 301 cause the upper housing to slide aft/rearward (if the fore-aft adjustment eccentric fastener is rotated clockwise) or to slide forward (if the fore-aft adjustment eccentric fastener is rotated counterclockwise). As the fore-aft position of the hinge 300 is adjusted, the fore-aft guide pins of the upper housing slide within the fore-aft guide openings 314, 315 of the fore-aft adjustment bracket 301.

The lateral adjustment eccentric fastener 307 may be rotated to adjust the lateral (i.e., left-right) position of the hinge 300 on the cabinet 200. As the lateral adjustment eccentric fastener 307 is rotated, the engagement between the cam 312 of the lateral adjustment eccentric fastener 307 and the lateral adjustment opening 339 in the lateral adjustment bracket 302 cause the lateral adjustment bracket 302 and the vertical adjustment bracket 303 to slide to the right (if the lateral adjustment eccentric fastener 307 is rotated clockwise) or to slide to the left (if the lateral adjustment eccentric fastener 307 is rotated counterclockwise). As the lateral position of the hinge 300 is adjusted, the lateral guide pins 352, 353 of the guide bracket 347 slide within the lateral guide openings 340, 341 of the lateral adjustment bracket 302.

The vertical adjustment eccentric fastener 308 may be rotated to adjust the vertical (i.e., up-down) position of the hinge 300 on the cabinet 200. As the vertical adjustment eccentric fastener 308 is rotated, the engagement between the cam 312 of the vertical adjustment eccentric fastener 308 and the vertical adjustment opening 336 in the vertical adjustment bracket 303 cause the lateral adjustment bracket 302 and the vertical adjustment bracket 303 to slide up (if the vertical adjustment eccentric fastener 308 is rotated clockwise) or to slide to down (if the vertical adjustment eccentric fastener 308 is rotated counterclockwise). As the vertical position of the hinge 300 is adjusted, the vertical adjustment guide pins 343, 344 of the lateral adjustment bracket 302 slide within the vertical guide openings 337, 338 of the vertical adjustment bracket 303.

In operation, when the cabinet door 202 is grasped and moved from the closed position to the open position, the lower housing 305 (and the lateral adjustment bracket 302, the vertical adjustment bracket 303, the guide bracket 347, and the rear cover plate 358 coupled to the lower housing 305) of the hinge 300 rotate about the hinge pin 327 that extends into the central openings 326, 333 of the upper and lower housings 304, 305, and the rotational guide pins 330, 331 slide within the arcuate channels 334, 335 of the lower housing 305.

While this invention has been described in detail with particular references to exemplary embodiments thereof, the exemplary embodiments described herein are not intended to be exhaustive or to limit the scope of the invention to the exact forms disclosed. Moreover, although the hinge is described herein for use on a cabinet, one of skill in the art would appreciate that the features could be applied to other hinged components. Persons skilled in the art and technology to which this invention pertains will appreciate that alterations and changes in the described structures can be practiced without meaningfully departing from the principles, spirit, and scope of this invention, as set forth in the following claims. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A hinge comprising:
- a fore-aft adjustment bracket comprising at least one fore-aft adjustment opening;
- a lateral adjustment bracket comprising at least one lateral adjustment opening;
- a vertical adjustment bracket comprising at least one vertical adjustment opening;
- an upper housing member coupled to the fore-aft adjustment bracket;
- a lower housing member coupled to the lateral adjustment bracket and the vertical adjustment bracket;
- a hinge pin in a hinge pin opening defined by the upper and lower housing members;
- a pair of guide pins in a pair of arcuate channels defined by the lower housing member;
- at least one fore-aft adjustment eccentric fastener configured to extend into the at least one fore-aft adjustment opening in the fore-aft adjustment bracket;
- at least one lateral adjustment eccentric fastener configured to extend into the at least one lateral adjustment opening in the lateral adjustment bracket; and
- at least one vertical adjustment eccentric fastener configured to extend into the at least one vertical adjustment opening in the vertical adjustment bracket.

2. The hinge of claim 1, further comprising an upper cover plate configured to cover a portion of the upper housing connected to the fore-aft adjustment bracket.

3. The hinge of claim 2, further comprising a rear cover plate.

4. The hinge of claim 3, further comprising a guide bracket between the lateral adjustment bracket and the rear cover plate, the guide bracket comprising:
- a backing plate comprising a pair of openings accommodating the at least one lateral adjustment eccentric fastener and the at least one vertical adjustment eccentric fastener; and
- a support rail on a front surface of the backing plate, the support rail supporting the lateral adjustment bracket and the vertical adjustment bracket.

5. The hinge of claim 4, wherein each of the at least one fore-aft adjustment eccentric fastener, the at least one lateral adjustment eccentric fastener, and the at least one vertical adjustment eccentric fastener comprises:
- a head;
- a stem coupled to the head; and
- a cam coupled to an end of the stem, wherein the stem is axially offset from a centerline of the head.

6. The hinge of claim 5, wherein the upper housing comprises:
- a cylindrical portion;
- an extension portion extending rearward from the cylindrical portion; and
- a pair of fore-aft adjustment guide pins extending upward from the extension portion.

7. The hinge of claim 6, wherein the fore-aft adjustment bracket comprises a pair of fore-aft guide openings elongated in a fore-aft direction, and wherein the pair of fore-aft adjustment guide pins are slidable in the pair of fore-aft guide openings.

8. The hinge of claim 7, wherein the lateral adjustment bracket comprises a pair of vertical adjustment guide pins.

9. The hinge of claim 8, wherein the vertical adjustment bracket comprises a pair of vertical guide openings elongated in a vertical direction, and wherein the pair of vertical adjustment guide pins are slidable in the pair of vertical guide openings.

10. The hinge of claim 9, wherein the guide bracket comprises a pair of lateral adjustment guide pins.

11. The hinge of claim 10, wherein the lateral adjustment bracket further comprises a pair of lateral guide openings elongated in a lateral direction, and wherein the pair of lateral adjustment guide pins are slidable in the pair of lateral guide openings.

12. The hinge of claim 11, wherein the lateral adjustment bracket further comprises a pass-through opening, and wherein the stem of the at least one vertical adjustment eccentric fastener extends through the pass-through opening.

13. A cabinet comprising:
- a framework;
- a cabinet door; and
- the hinge of claim 1 hingedly coupling the cabinet door to the framework.

14. The cabinet of claim 13, wherein:
- an inner surface of an upper wall of the framework comprises a first recess accommodating the fore-aft adjustment bracket; and
- an inner surface of the cabinet door comprises a second recess accommodating the vertical adjustment bracket.

* * * * *